US012560431B2

(12) United States Patent
Vogel

(10) Patent No.: US 12,560,431 B2
(45) Date of Patent: Feb. 24, 2026

(54) SURVEYING SYSTEM AND METHOD OF OPERATING A SURVEYING SYSTEM

(71) Applicant: Trimble Inc., Westminster, CO (US)

(72) Inventor: Michael Vogel, Jena (DE)

(73) Assignee: Trimble Inc., Westminster, CO (US)

( * ) Notice: Subject to any disclaimer, the term of this patent is extended or adjusted under 35 U.S.C. 154(b) by 297 days.

(21) Appl. No.: 18/539,901

(22) Filed: Dec. 14, 2023

(65) Prior Publication Data

US 2024/0219177 A1 Jul. 4, 2024

(30) Foreign Application Priority Data

Dec. 23, 2022 (EP) ..................................... 22216639

(51) Int. Cl.
G01C 11/02 (2006.01)
(52) U.S. Cl.
CPC ..................................... G01C 11/02 (2013.01)
(58) Field of Classification Search
None
See application file for complete search history.

(56) References Cited

U.S. PATENT DOCUMENTS

| | | | | |
|---|---|---|---|---|
| 6,087,645 A | * | 7/2000 | Kitajima | G01B 11/26 |
| | | | | 250/203.1 |
| 2017/0299386 A1 | * | 10/2017 | Kumagai | G05B 7/00 |
| 2020/0264282 A1 | * | 8/2020 | Vogel | G01S 17/86 |

OTHER PUBLICATIONS

Extended European Search Report for Application No. 22216639.9-1009, mailed Sep. 4, 2023, 10 pages.

* cited by examiner

*Primary Examiner* — Heather R Jones
(74) *Attorney, Agent, or Firm* — Kilpatrick Townsend & Stockton LLP

(57) ABSTRACT

A surveying system comprises a base 3, a first alidade 7 mounted on the base and rotatable relative to the base about a first axis 9, a first optical instrument 17 mounted on the first alidade 7, wherein the first optical instrument is configured to emit a first beam 41 of measuring light, a second alidade 19 mounted on the base and rotatable relative to the base about a second axis 21, and a second optical instrument 25 mounted on the second alidade, wherein the second axis substantially coincides with the first axis. The first optical instrument includes a scanner 31, and the second optical instrument includes at least one camera 63.

15 Claims, 3 Drawing Sheets

SURVEYING SYSTEM AND METHOD OF OPERATING A SURVEYING SYSTEM

CROSS-REFERENCE TO RELATED APPLICATIONS

This application claims priority to European Patent Application No. 22216639.9, filed Dec. 23, 2022, the entire contents of which are incorporated herein by reference for all purposes.

FIELD

The present invention relates to surveying systems and methods of operating such surveying systems.

BACKGROUND

A surveying system known from EP 3 696 499 A1 comprises a base mounted on a tripod, an alidade mounted on the base and rotatable relative to the base about a vertical axis, and optical instruments mounted on the alidade. The optical instruments include a scanner for performing distance measurements using a beam of measuring light emitted from a rotating mirror towards distant objects, wherein light received back from the distant objects is detected in order to determine the distances of the objects from the surveying instrument. The light beams emitted from the rotating mirror coincide with a vertical plane orthogonal to the axis of rotation of the mirror so that distances to objects intersecting this plane can be measured with one revolution of the mirror. In order to measure the distances to all objects surrounding the surveying instrument, the alidade is rotated relative to the base over a range of 180° while the rotation of the mirror continues. The rotation of the alidade results in a corresponding rotation of the vertical plane so that, during the rotation of the alidade, a huge number of distances to objects surrounding the surveying instrument can be measured. Coordinates of the distant objects can be determined by associating the measured distances with the rotational positions of the alidade and of the rotating mirror.

The optical instruments of the known surveying system further include plural cameras mounted on the alidade for recording visual images of the objects surrounding the surveying instrument. Images of substantially the complete surroundings of the surveying system can be recorded in one revolution of the alidade about the vertical axis. It is then possible to combine the data the distance measurements and the data of the visual images.

However, it has been found difficult to combine the data obtained from the two types of optical instruments, i.e, the distance measuring scanner and the visual cameras, to the full satisfaction of the user.

SUMMARY

In view of the above, it is an object of the present invention to provide a surveying system comprising at least two types of optical instruments allowing to combine measurement data obtained from the two types of measuring instruments with a higher quality and accuracy.

According to embodiments, a surveying system comprises a base, a first alidade mounted on the base and rotatable relative to the base about a first axis, a first optical instrument mounted on the first alidade, a second alidade mounted on the base and rotatable relative to the base about a second axis, and a second optical instrument mounted on the second alidade, wherein the first optical instrument is configured to emit a first beam of measuring light and wherein the second axis substantially coincides with the first axis.

In this surveying system, each of the first and second optical instruments is mounted on its own alidade and can be rotated relative to the base independently from the other optical instrument. Since the axes of rotation of the first and second alidades substantially coincide, the first and second optical instruments can achieve functionalities corresponding to those of surveying instruments in which two optical instruments of different types are mounted on a same alidade. In addition, the mounting of the first and second optical instruments on two different alidades which can be independently rotated relative to the base allows for new functionalities and advantages such as an operation mode in which the obtaining of data using the first optical instrument requires rotation patterns of its alidade different from the rotation patterns of the alidade of the second optical instrument.

As mentioned above, the first axis and the second axis substantially coincide. While it may be desirable that the first and second axes exactly coincides, this will be possible in practice only to a certain degree. The accuracy with which the first and second axes coincide is restricted by the accuracy with which the mechanical components establishing these axes, such as bearings between the alidades are manufactured and adjusted. Therefore, in practice, the first and second axes do not exactly coincide but are arranged such that a smallest distance between the first axis and the second axis is small and that an angle between the first axis and the second axis is small.

Specifically a designer of the system will select the individual components such that an available budget with respect to accuracy and an available cost budget meet a desired result. According to some embodiments, this requires that a smallest distance of the second axis from the first axis is less than 3 mm, in particular less than 1 mm, and in particular less than 0.3 mm. According to other embodiments, this requires that an angle between a direction of the first axis and a direction of the second axis is less than 1°, in particular less than 0.3°, and in particular less than 0.1°. According to further embodiments, this requires that the first axis is close to the second axis, wherein the distance between the axes is limited by the lateral extension of the base in a direction orthogonal to the first axis to less than 500 mm. The above considerations for pairs of axes which coincide in an ideal case and which are in practice arranged at a small distance from each other with a small angle between them are applicable to other pairs of axes which substantially coincide throughout the present disclosure.

According to embodiments, the first optical instrument includes at least one component rotatable relative to the first alidade about a third axis. The rotatable component may include a mirror, wherein the first beam of measuring light is reflected from the mirror towards a distant object. The rotation of the mirror can be used to rotate the beam of measuring light such that it scans objects surrounding the surveying system. According to embodiments, the third axis intersects the first axis, and the third axis can be orthogonal to the first axis. Tus, the first axis and the third axis substantially intersect at substantially 90°. While it may be desirable that the first and second axes exactly intersect at exactly 90°, this will be possible in practice only to a certain degree. The accuracy with which the first and second axes intersect orthogonally is restricted by the accuracy with which the mechanical components establishing these axes, such as bearings between the components are manufactured and adjusted. Therefore, in practice, the first and third axes do not exactly intersect but are arranged such that a smallest distance between the first axis and the third axis is small and that a deviation of the angle between the first axis and the third axis from 90° is small. Specifically a designer of the system will select the individual components such that an available budget with respect to accuracy and an available cost budget meet a desired result. According to some embodiments, this requires that a smallest distance of the third axis from the first axis is less than 1 mm, in particular less than 0.3 mm, and in particular less than 0.1 mm, and/or that an absolute value of a difference between 90° and an angle between a direction of the first axis and a direction of the third axis is less than 1°, in particular less than 0.3°, and in particular less than 0.1°. The above considerations for pairs of axes which orthogonally intersect in an ideal case and which are in practice arranged at a small distance from each other with a small deviation from 90° of the angle between them are applicable to other pairs of orthogonally intersecting axes throughout the present disclosure.

According to embodiments, the first optical instrument includes a light detector configured to receive and detect emitted measuring light returning from the distant object. In some embodiments, the returning measuring light is also reflected from the mirror before it is received by the light detector. By detecting the measuring light returning from the distant object, it is possible to measure physical properties of the distant object, such as the distance of the object from the surveying system.

According to some embodiments, the second optical instrument includes optical components configured to provide at least one optical beam path, wherein the optical components include at least one second mirror, and wherein each of the at least one second mirror is arranged in one optical beam path of the at least one optical beam path. The optical components may further comprise lenses, prisms, light sources, detectors and the like. Light traveling along the optical beam path is reflected by the second mirror so that the optical beam path is folded by the second mirror.

According to specific embodiments herein, a portion of the optical beam path extends away from the second mirror towards a distant object. A central fifth axis of the optical beam path in this portion may substantially intersect the third axis, or it may have a smallest distance from the third axis which is less than 3 mm, in particular less than 1 mm, and in particular less than 0.3 mm. According to further embodiments the fifth axis may substantially intersect the first axis, or it may have from the first axis is less than 3 mm, in particular less than 1 mm, and in particular less than 0.3 mm. Herein, the fifth axis intersects an intersection point of the third axis and the first axis, or at least comes close to such intersection point. The intersection point of the third axis and the first axis is the point or region were the third axis and the first axis come close to each other or intersect. This intersection point can be seen as an origin of the beam of measuring light of the first optical instrument, wherein this origin is substantially not changed by the rotation of the mirror and by the rotation of the alidade. Since the central fifth axis of the optical beam path of the second optical instrument seems to originate from the same origin as the beam of measuring light of the first optical instrument, both the first and second optical instruments can perform measurements from a substantially same origin or viewpoint. This offers an advantage in that measurement results of the first and second optical instruments can be combined by performing calculations, such as coordinate transformations, having a reduced complexity as compared to a situation where suitably selected origins of coordinates systems of the first and second optical instruments behave in more complicated ways.

According to further embodiments, the at least one second mirror of the second optical instrument is a semi-transparent mirror, wherein the first alidade can be rotated relative to the second alidade and the first mirror of the first optical instrument can be rotated relative to the first alidade such that the first beam of measuring light traverses the second mirror so that the first beam of measuring light substantially coincides with the central fifth axis of the portion of the optical beam path of the second optical instrument extending away from the second mirror. The first and second optical instruments can then perform functions, such as measurements, targeting a same distant object. For example, the second optical instrument may include at least one first camera positioned in the at least one optical beam path and configured to record images of distant objects using light received via the optical beam path. Such first camera can be used to record images of objects surrounding the surveying instrument. The recording of the images using the first camera can be performed simultaneously with and independent from measurements performed using the first optical instrument. Moreover, if the beam of measuring light of the first optical instrument traverses the semi-transparent second mirror, this beam of measuring light is directed at a same object which is also imaged by the camera. This means that the first camera may detect images including a light spot generated by the beam of measuring light on the object detected by the camera. The position of the light spot within the image of the object recorded by the first camera can be analysed and used to calibrate the camera. The calibration may comprise a determination of a coordinate transformation mapping pixels of the first camera into a coordinate system of the first optical instrument.

According to some embodiments, a relation $0.9 < L2/L1 < 1.1$ holds between L1 and L2, wherein L1 is a distance measured along a beam path of the first camera between a mirror surface the mirror and an entrance pupil of a lens of the camera, and wherein L2 is a distance between a point on the first axis which is closest to the third axis and the mirror. The relation means that the two length L1 and L2 are equal to each other and may differ by a relatively small amount. The point on the first axis which is closest to the third axis is the intersection point between the first axis and the third axis if the first and third axis intersect exactly. The lens of the first camera may comprise plural lens elements. The position of the entrance pupil of the lens along the optical axis of the lens can be determined as usual in the art. With such arrangement, a virtual camera position is established where a nodal point of the camera coincides with the intersection point of the first and third axes. If the second optical instrument is rotated, together with the camera, about an axis intersecting this intersection point, the images recorded by the camera can be stitched together to form a combined image with a reduced amount of computation.

According to some embodiments, the optical components of the second optical instrument include plural second mirrors distributed about a fourth axis, wherein each of the plural second mirrors is arranged in one optical beam path of the at least one optical beam path, such that plural optical beam paths are provided and wherein each of these plural optical beam paths includes a portion extending away from an origin of the first beam of measuring light of the first optical instrument. For example, the second optical instrument may include plural cameras, wherein each of the plural cameras receives light reflected from one second mirror wherein each of these cameras can record images from a viewpoint positioned on an axis of the first beam of measuring light of the first optical instrument.

According to some embodiments, the fourth axis substantially intersects the second axis, such that a smallest distance of the fourth axis from the second axis is less than 3 mm, in particular less than 1 mm, and in particular less than 0.3 mm. According to other embodiments, the fourth axis is substantially orthogonal to the second axis, such that an absolute value of a difference between 90° and an angle between a direction of the second axis and a direction of the fourth axis is less than 1°, in particular less than 0.3°, and in particular less than 0.1°.

According to some embodiments, the first alidade can be rotated relative to the second alidade. Herein, it is not required, that the second alidade can be freely rotated relative to the first alidade since electrical cables for supplying power to the optical instruments or other mechanical components can restrict the free rotation of the two alidades relative to each other. However, a suitable range of rotation of the two alidades relative to each other, such as a range of 1°, 5°, 10°, or 20°, can be provided.

According to some embodiments, the surveying system comprises at least one motor for rotating the first and second alidades relative to the base, and a controller for operating the at least one motor in order to control the rotational positions of the first and second alidades relative to the base. The controller may have a first mode of operation in which the at least one motor is driven to rotate the first alidade relative to the base at a given speed in a given direction, and to simultaneously maintain the second alidade relative to the base at a given position. For example, the rotation of the first alidade at the given speed can be used to scan objects surrounding the surveying system using the first optical instrument while the maintaining of the second alidade at the given position can be used to record images with cameras of the second optical instrument such that motion blur in the recorded images is substantially prevented.

According to some embodiments, the controller has a second mode of operation, in which the at least one motor is driven to continue to rotate the first alidade relative to the base at the given speed in the given direction, while the second alidade is rotated relative to the base in the given direction at a speed greater than the given speed. Herein, the controller can be configured to alternatingly operate in the first and second modes of operation. It is thus possible to continuously scan the surroundings of the surveying system using the first optical instrument, and to record images of these surroundings using the second optical instrument wherein the cameras of the second of the instruments are maintained at rest while the images are recorded.

Similarly, according to embodiments, a method of operating a surveying instrument comprises measuring distances of remote objects by operating a scanner, and recording images of the remote object by operating plural cameras. Herein, the measuring of the distances comprises rotating the scanner about a first axis at a constant speed. Also, the recording of the images comprises a first step of rotating the plural cameras about a second axis substantially coinciding with the first axis at a speed greater than the constant speed for a first duration of time, and a second step of maintaining the plural cameras at a stationary angular position about the second axis for a second duration of time. In this method, the first and second steps are alternatingly performed. According to particular embodiments, the two steps are repeated more than 20 times. According to further particular embodiments, the two steps are repeated until the scanner has been rotated at the constant speed over a range of more than 360°.

According to embodiments herein, the operating of the scanner comprises rotating a beam of measuring light about a third axis substantially orthogonal to the first axis.

According to embodiments, a surveillance system comprises a base, at least one alidade mounted on the base and rotatable relative to the base about a first axis, a first mirror rotatable about a third axis of the of the at least one alidade, a first light source configured to emit a first beam of measuring light onto the first mirror such that the first beam of measuring light reflected from the first mirror can be directed to a distant object. For example, the first axis and the third axis may substantially intersect at an angle of 90°. Further, the first beam of measuring light reflected from the rotating mirror can be used to perform distance measurements, for example, wherein the beam is scanned around the third axis while the at least one alidade is rotated about the first axis.

The surveying system may further comprise at least one support rotatable about a fourth axis, at least one third mirror mounted on the at least one support at a distance from the third axis, and at least one third optical instrument mounted on the at least one support. Herein, the at least one third optical instrument includes optical components configured to provide at least one optical beam path, wherein the at least one third mirror is positioned within the at least one optical beam path. According to embodiments, the surveying system is configured such that the first mirror can be rotated to an angular position such that the first beam of measuring light reflected from the first mirror extends along a beam axis substantially coinciding with a main axis of a portion of the at least one optical beam path. Such configuration offers an advantage in that a function of the third optical instrument can be targeted to a same object to which the first beam of measuring light is or can be directed.

According to embodiments, the third optical instrument includes a second light detector. Therefore, the second light detector may detect light received from an object to which also the first beam of measuring light is or can be directed.

According to some embodiments, the at least one support is rotatable about a fourth axis substantially coinciding with the second axis. This allows to orient the optical beam path to any direction to which the first beam measuring light can be oriented. Therefore, it is possible to perform a measurement using the first beam of measuring light towards a given object while the third mirror is rotated to a position such that it does not interfere with the first beam of measuring light, and then, without changing an orientation of the alidade relative to the base, the third mirror can be rotated to a position such that the optical beam path coincides with an axis of the first beam of measuring light, and a measurement can be performed relative to the same object using the third optical instruments. According to such a procedure, measurements relative to the distant object can be performed using the first and third optical instruments one after the other. According to further embodiments, the third mirror is a semi-transparent mirror such that it can be traversed by the first beam of measuring light. It is then possible, to perform simultaneous measurements relative to the same object by both the first and third optical instruments.

According to some embodiments, the third axis and the fifth axis substantially coincide. According to some embodiments herein, a smallest distance of the first axis from the third axis is less than 3 mm, in particular less than 1 mm, and in particular less than 0.3 mm, and/or an angle between a direction of the fifth axis and a direction of the third axis is less than 1°, in particular less than 0.3°, and in particular less than 0.1°.

According to some embodiments herein, the at least one support includes a first support on which of the at least one third mirror is mounted, and a second support on which the at least one third optical instrument is mounted, wherein the first support is rotatable about the fifth axis, and wherein also the second support may be rotatable about the fifth axis.

According to some embodiments, the first support is mounted on the first alidade, and the second support is mounted on the second alidade illustrated above.

BRIEF DESCRIPTION OF THE DRAWINGS

Embodiments of the invention may be illustrated with reference to the drawings below. Herein.

DETAILED DESCRIPTION

Figure 1:
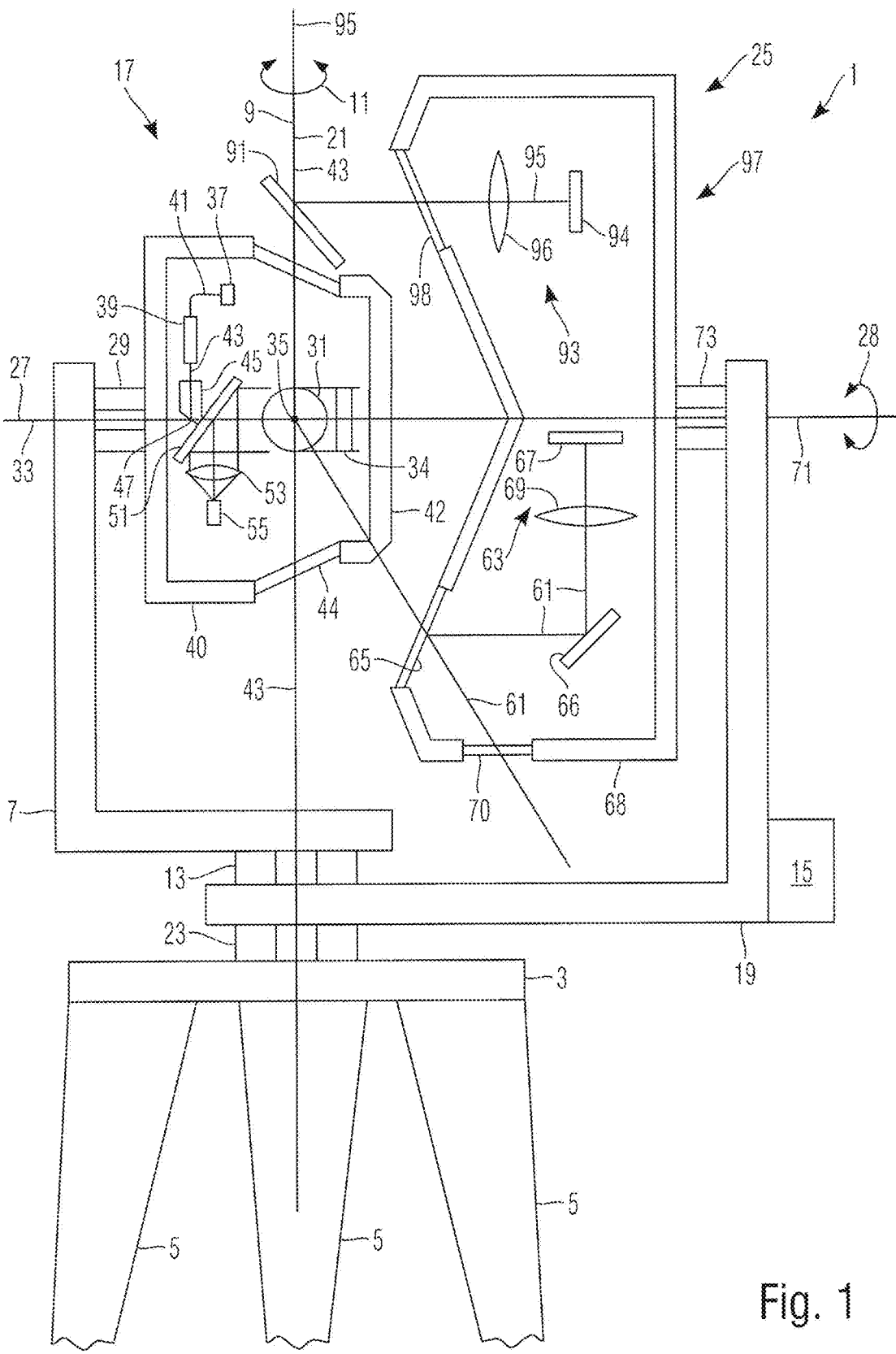
FIG. 1 is a schematic sectional of view along a vertical plane of a surveying system according to an embodiment.
Figure 2:
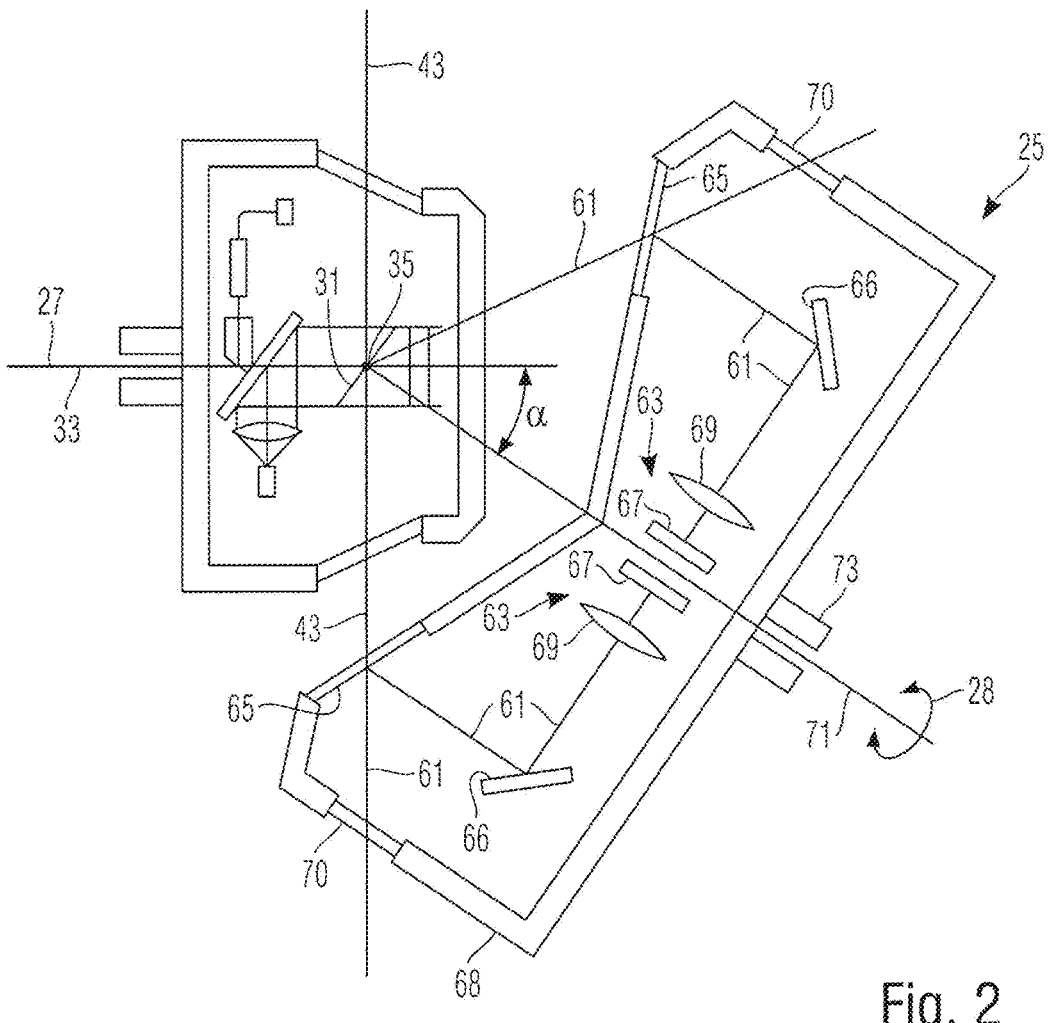
FIG. 2 is a partial schematic sectional view from above and along a horizontal plane of the surveying system shown in FIG. 1.

An exemplary surveying system will be illustrated with reference to FIGS. 1 and 2 below. Herein, FIG. 1 is a schematic sectional view along a vertical plane of the surveying system 1, and FIG. 2 is a partial schematic sectional view along a horizontal plane of the surveying system 1. The surveying system 1 comprises a base 3 mounted on a tripod 5. A first alidade 7 is mounted on the base 3 and can be rotated relative to the base 3 about an axis 9 as indicated by an arrow 11 in FIG. 1. In practice, the tripod 5 will be placed, for example, on a floor such that the axis 9 extends in the vertical direction. The surveying system 1 comprises a motor 13 controlled by a controller 15 for rotating the first alidade 7 relative the base 3 about the axis 9. Specifically, the controller 15 operates the motor 13 in order to position the first alidade 7 at a desired orientation relative to the base 3 or to rotate the first alidade 7 relative to the base 3 at a desired speed.

A first optical instrument 17 is mounted on the alidade 7 such that it is rotatable about an axis 27, as indicated by an arrow 28 in FIG. 1, by a motor 29 controlled by the controller 15.

The surveying system 1 further comprises a second alidade 19 is mounted on the base 3. The second alidade 19 can be rotated relative to the base 3 about an axis 21 as also indicated by the arrow 11 in FIG. 1. The surveying system 1 further comprises a motor 23 controlled by a controller 15 for rotating the second alidade 19 relative the base 3 about the axis 21, as indicated by the arrow 11. Specifically, the controller 15 operates the motor 23 in order to position the second alidade 19 at a desired orientation relative to the base 3 or to rotate the second alidade 19 relative to the base 3 at a desired speed.

A second instrument 25 is mounted on the second alidade 19 such that it is rotatable about an axis 71, as also indicated by an arrow 28 in FIG. 1, by a motor 73 controlled by the controller 15.

In an ideal situation, the axis 9 and the axis 21 coincide. In practice, the accuracy with which the first and second axes 9, 21 coincide is restricted by the accuracy with which the mechanical components of the alidades 7, 19, the base 3 and bearings between those components are manufactured and adjusted. Therefore, in practice, the first and second axes 9, 21 do not exactly coincide but are arranged such that a smallest distance between the axis 9 and the axis 21 is small, for example less than 3 mm, in particular less than 1 mm, and in particular less than 0.3 mm, and/or such that an angle between a direction of the axis 9 and a direction of the axis 21 is small, for example less than 1°, in particular less than 0.3°, and in particular less than 0.1°.

The first optical instrument 17 comprises an elliptical mirror 31 which is rotatable about an axis 33 by a motor 34 controlled by the controller 15, as indicated also by the arrow 28. The axis 33 of rotation of the mirror 31 relative to the first optical instrument 17 substantially coincides with the axis 27 of rotation of the first optical instrument 17 relative to the alidade 7. Again, the two axes 27 and 33 exactly coincide only in the ideal case, and in practice a smallest distance between the axis 27 and 33 is small and can be limited to be less than 3 mm, in particular less than 1 mm, and in particular less than 0.3 mm, for example. Similarly, an angle between the axis 27 and 33 can be small and limited to be less than 1°, in particular less than 0.3°, and in particular less than 0.1°, for example.

Moreover, the first optical instrument 17 and the alidade 7 are configured such that the axis 33 substantially intersects the axis 9 at an angle of 90°. Herein, the exact mathematical intersection of the axes 9 and 33 at exactly 90° reflects the ideal situation. In practice, a distance between the axis 9 and 33 and the angle between these axes depends on mechanical limitations and possibly also on the rotational position of the first optical instrument 17 relative to the first alidade 7 about the axis 27. However, the surveying system 1 can be designed such that the smallest distance between the axis 9 and the axis 33 is small, such as less than 3 mm, in particular less than 1 mm, and in particular less than 0.3 mm. Similarly, the angle between the axis 9 and the axis 33 may deviate from 90° by a small amount, such as less than 1°, in particular less than 0.3°, and in particular less than 0.1°. The surveying system can be designed such that the above limitations to the distance and angle can be fulfilled at substantially all rotational positions of the first optical instrument 17 relative to the first alidade 7 about the axis 27 and all rotational positions of the first alidade 7 relative to the base 3 above the axis 9.

The ideal point of intersection between the third axis 33 and the axis 9, or the region where these axes 33, 9 come closest to each other, is referred to as the intersection point 35 below.

The first optical instrument 17 further comprises a light source 37, such as a laser light source, pulsed laser source and a fibre laser, for example. The light source 37 generates light pulses 30) supplied to an emitting element 39, such as a collimation lens, via a fibre 41. A first beam 43 of measuring light is emitted from the emitting element 39, enters a prism 45 and is reflected from an internal surface 47 of the prism 45 towards the mirror 31. Herein, the components are arranged such that, between the internal surface 47 and the mirror 31 the first beam 43 of measuring light propagates along the third axis 33. Moreover, the mirror 31 is oriented relative to the axis 33 under 45°, and the intersection point 35 is positioned on the mirror surface. Therefore, the beam 43 of measuring light is reflected from the mirror 31 in a direction orthogonal to the axis 33. Thus, the beam of measuring light 43 can be directed to distant objects, wherein the beam appears to originate from the intersection point 35 and wherein its direction is determined based on the rotational position of the mirror 31 relative to the first alidade 7 about the axis 33. Herein, the beam 43 of measuring light can be directed in any direction within the above-mentioned plane orthogonal to the axis 33. Moreover, the orientation of that plane relative to the base about the axis 9 can be selected by rotating the first alidade 7 relative to the base 3 about the axis 9 using the motor 13 controlled by the controller 15.

Light of the beam of measuring light 43 incident on a remote object is scattered by the remote object, and a portion of this scattered light travels back to the mirror 31, is reflected from the mirror 31 towards a mirror 51 which directs the returning light towards a collimator 53 concentrating the returning light on a detector 55. Herein, the prism 45 is coupled to the mirror 51 such that the beam of measuring light 43 reflected from the internal surface 47 can traverse the mirror 51 through a small hole provided in the mirror 51, or through a portion of the surface in which a reflective coating is omitted which is otherwise providing the mirror surfaces.

The emission times of the light pulses generated by the light source 37 are controlled by the controller 15, and the controller 15 also measures the times when scattered light of these pulses returns to the surveying system and is detected by the detector 55. Accordingly, the controller 15 may determine a distance of an object onto which the beam 43 of measuring light is directed from the surveying system 1.

In order to arrange the optical components of the first optical instrument 17 as illustrated above, the first optical instrument 17 comprises a chassis having a first portion 40 which is rotatably mounted on the first alidade 7 and receives and carries the light source 37, the emitting element 39, the prism 45, the mirror 51 and detector 55.

The chassis further comprises a second portion 42 which receives and carries the motor 34 and the mirror 31. The first portion 40 and the second portion 42 of the chassis are connected by a window 44 which extends around the axis 27 and allows the beam 43 of measurement light reflected from the mirror 31 to pass through towards the distant object, and allows the light returning from the object to pass through towards the detector 55. The window 44 further has a conical shape such that the window surfaces are not exactly orthogonal to the beam traversing the window 44 to prevent that a portions of the beam 43 of measuring light reflected from the surfaces reach the detector 55.

Referring to FIG. 2, the second optical instrument 25 comprises optical components configured to provide plural optical beam paths. In the sectional view of FIG. 2, one of these optical beam paths is represented by a central axis 61. Each optical beam path 61 is provided by a camera 63 and two mirrors 65 and 66. The camera 63 comprises a detector 67 and a lens 69. FIG. 2 also shows a situation, in which the second alidade 19 is rotated relative to the first alidade 7 such that the axis 27 of rotation of the first optical instrument 17 is not parallel and does not coincide with the axis 71 of rotation of the second optical instrument 25 relative to the second alidade 19. An angle α between the axis 27 and the axis 71 is about 25° in the situation shown in FIG. 2. The axis 71 substantially intersects the intersection point 35 at substantially all available rotational positions of the second alidade 19 relative to the first alidade date 7.

The mirror 65 folds the optical beam path 61 and is oriented such that a central axis of the portion of the optical beam path 61 extending away from the mirror 65 towards a distant object also substantially intersects the intersection point 35 in substantially all available rotational positions of the second optical instrument 25 relative to the second alidade 19 about the axis 71, and substantially all available rotational positions of the second alidade 19 relative to the first alidade 7 about the rotational axes 9 and 21.

Moreover, the mirror 65 is semi-transparent such that has a function of a window for the beam 43 of measuring light and allows the beam 43 of measuring light to traverse the mirror 65 while the beam path 61 is folded by the mirror 65. Further, a chassis 68 of the second optical instrument 25 has a window 70 to traversed by both the beam 43 of measuring light and the beam path 61 to traverse the chassis 68.

With such arrangement, it is possible that the camera 63 records images of the distant object along an optical beam path which appears to traverse the intersection point 35. Since also the beam 43 of measuring light of the first optical instrument 17 originates from the intersection point 35 it is possible to combine measurement data obtained by the first optical instrument 17 and by the second optical instrument 25 without performing coordinate transformations which would be otherwise required if the measurements of the instruments were made along optical beam paths not intersecting at a common intersection point. Therefore, the measured distances of various objects from the surveying system 1 can be mapped to the images recorded by the cameras 63 with high accuracy.

The second optical instrument 25 can be configured such that a distance along the beam path 61 between the mirror surface of the mirror 65 and a nodal point of the camera 63 is of about the same size as a distance between the mirror surface of the mirror 65 and the intersection point 35. The lens 69 is then located at a position which optically corresponds to a position near the intersection point 35, and the camera 63 may record images as if it were located at the intersection point 35 itself. The nodal point of a camera is a point on the optical axis of the camera at which rays entering the lens of the camera appear to converge. In practice, according to a good approximation, the intersection of the entrance pupil of the lens 69 with the optical axis of the camera 61 can be assumed to represent the nodal point with sufficient accuracy. Accordingly, a distance along the beam path 61 between the mirror surface of the mirror 65 and an entrance pupil of the lens 69 of the camera 63 is of about the same size as a distance between the mirror surface of the mirror 65 and the intersection point 35. With this arrangement, the plural images recorded by the camera 63 at the different rotational positions about the intersection point 35 can be stitched together to form a combined image with a lesser amount of computation.

While only two cameras 63 are shown in the sectional view of FIG. 2, a higher number of cameras 63, such as five or ten cameras can be distributed around the axis 71. The number of cameras 63 is advantageously selected such that the fields of view of the cameras 63 overlap with each other, so that images covering substantially the whole surroundings of the surveying system 1 can be recorded by rotating the alidade 19 together with the second optical instrument 25 around the axis 21. The plurality of images recorded by the cameras can be stitched together to form a combined image representing a significant portion of the surroundings of the surveying system 1. Herein, it can be advantageous to design the cameras 69 and the positions of the cameras 69 relative to the intersection point 35 such that the nodal point of each camera 69 substantially coincides with the intersection point 35. The nodal point of a lens system is the point where the rays entering the lens apparently converge. For practical purposes, the position of the entrance pupil of the lens along the optical axis can be used as the nodal point.

Similarly, distances to substantially all objects surrounding the surveying system 1 can be measured by rotating the alidade 7 together with the first optical instrument 17 around the axis 9 while the mirror 31 is rotating. Herein, the first alidade 7 can be rotated at a constant speed to generate a continuous flux of distance measurement data.

However, if also the second alidade 19 were rotated at the constant speed while the cameras 63 of the second optical instrument 25 record the visual images, these images would show some motion blur due to a minimum exposure time required to record images using the cameras 63. Therefore, the alidade 19 is maintained at stationary rotational positions about the axis 21 while the cameras 63 record images.

A method of operating the first and second optical instruments 17 and 25 will be illustrated with reference to FIG. 3 below.

Figure 3:
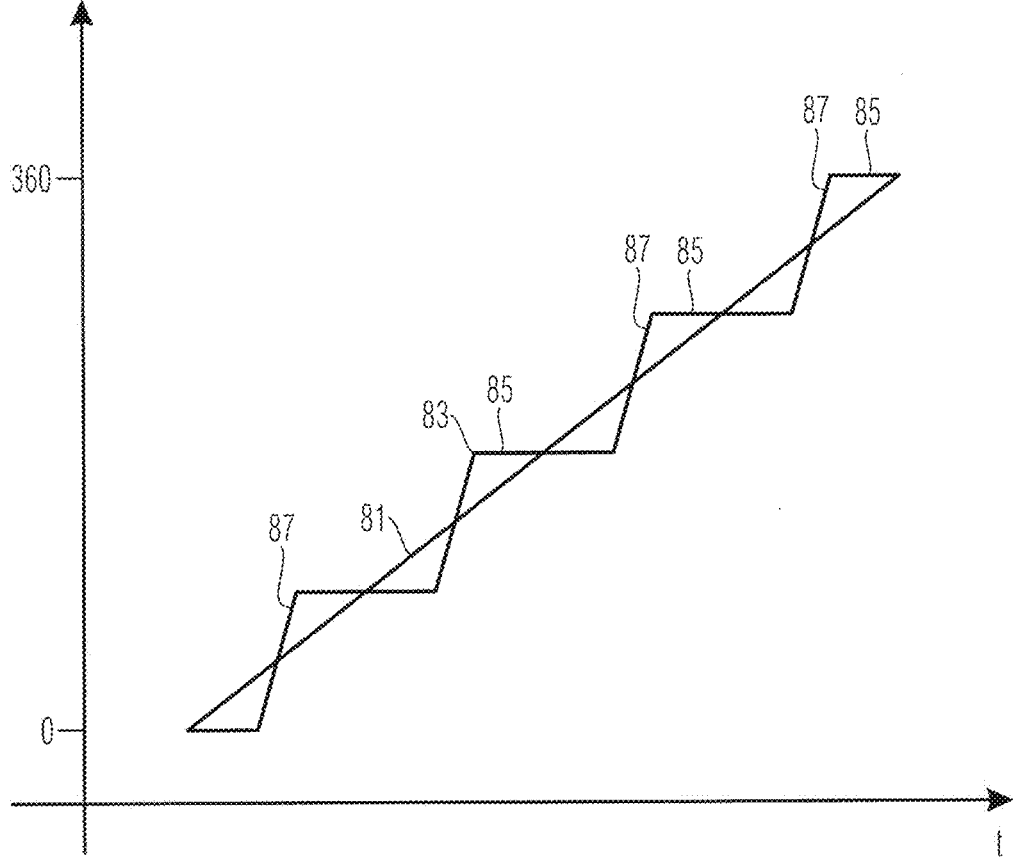
FIG. 3 is a graph illustrating modes of operation of the surveying system shown in FIGS. 1 and 2.

FIG. 3 is a graph showing the rotation of the first and second alidades 7 and 19, wherein the horizontal axis represents the time and the vertical axis the angle. A line 81 represents the rotation of the first alidade 7 at a constant speed over an angular range of 360°. A line 83 represents the rotation of the second alidade 19, wherein the rotation is a stepwise rotation, with phases 85 in which the rotational position of the second alidade 19 is maintained constant, and phases 87 in which the second alidade 19 rotates in the same direction as the first alidade 7 at a speed higher than the constant speed of the first alidade 7. Visual images are recorded using the cameras 63 in the phases 85 in which the second alidade 19 is maintained at rest. The speed of the second alidade 19 in the phases 87 is selected such that the phases 87 are sufficiently short such that images recorded in one phase 85 partially overlap with images recorded in the subsequent next phase 85. Distance measurements are continuously acquired throughout the whole rotation of the first optical instrument 17 over the range of 360°. At the end of this procedure, substantially the whole surroundings of the surveying instrument 1 are covered with distance measurements and visual images.

As shown in the lower portion of FIG. 2, the second optical instrument 25 can be rotated about the axis 71 such that the optical beam path 61 of one of the cameras 63 is in a horizontal plane intersecting the intersection point 35, and the second alidade 19 is rotated about the vertical axis 21 such that the portion of the optical beam path 61 extending away from the mirror 65 towards the distant object substantially coincides with the vertical plane intersecting the intersection point 35. The mirror 65 is semi-transparent such that it not only folds the optical beam path 61 but also allows the beam 43 of measuring light to traverse the mirror 65. In this configuration, the beam of measuring light emitted from the first optical instrument 17 is incident on a same object which is also imaged by the camera 63 of the second optical instrument. Specifically, the beam of measuring light 43 may generate a beam spot on the object which is also visible in the image recorded by the camera 63. The image 63 can then be analysed to identify the position of the beam spot within the image, and the information about this position can be used to calibrate the coordinate systems of the camera 63 and of the first optical instrument 17. In this process, it is also possible to vary the rotational position of the alidade 19 about the axis 21 and the rotational position of the second optical instrument 25 about the axis 71 to move the beam spot around within the recorded images and to collect more data allowing to improve the calibration of the camera. This process can be repeated for each of the cameras 63 of the second optical instrument 25 by rotating each of the plural cameras 63 into the configuration illustrated above and by performing the recording of the images.

The camera 63 in the lower portion of FIG. 2 illustrates a particular situation in which objects imaged by the camera 63 can be simultaneously targeted with the measuring light beam 43 of the first optical instrument 17. In the situation shown in FIG. 2, these objects are located close to a line of intersection between the vertical plane including the intersection point 35 and the horizontal plane including the intersection point 35. In general, it seems difficult to achieve the same effect with objects within the field of view of other cameras 63 and at arbitrary orientations of the second alidade 19 about the vertical axis 21.

Sometimes, it is desirable to apply the functions of the first and second optical instruments 17 and 25 simultaneously to arbitrarily selectable objects.

For this purpose, a flat semi-transparent mirror 91 (see FIG. 1) is provided on the first optical instrument 17 such that this mirror 91 is traversed by the beam 43 of measuring light of the first optical instrument 17 when the rotating mirror 31 is oriented in a particular direction. The first optical instrument 17 may then perform a distance measurement with the beam 43 traversing the mirror 91.

A camera 93 having a detector 94, a lens 96 and a window 98 is mounted on the second optical instrument 25 such that its main axis 95 intersects the mirror 91. The mirror 91 is oriented such that the main axis 95 of an optical beam path of the camera 93 is folded such that a portion of the main axis 95 of this optical beam path extends away from the surveying system 1, and such that the main axis 95 of the optical beam path of the camera 93 extending away from the surveying system 1 may coincide with the beam 43 of measuring light directed to the distant object when the mirror 31 is oriented in a particular direction. It is then possible to perform distance measurements with the first optical instruments 17 to objects which can be simultaneously imaged with the camera 93.

In the configuration illustrated above, the mirror 91 and the camera 93 can be considered to form a third optical instrument 97 provided on a support which is rotatable relative to the first alidade 7 about the axis 27. This support is formed by the first optical instrument 17 which carries the mirror 91 and is rotatable about the axis 27, and it is further formed by the structure of the second optical instrument 25 which is rotatable about the axis 71 relative to the second alidade 19. The third optical instrument 97 can be rotated about the axes 27 and 71, respectively, by a common rotation of the first optical instrument 17 and the second optical instrument 25. Moreover, the third optical instrument 97 can be rotated about the axis 9, 21, respectively by rotating the first and second alidades 7 and 19 about these axes. Therefore, it is possible to record images of substantially any object surrounding the surveying instrument 1, and to simultaneously perform distance measurements relative to the imaged objects.

In the situation illustrated above, the third optical instrument 97 is the camera 93 with a beam 95 path folded by the mirror 91. It is also possible to provide other optical instruments different from the camera 93 which can target the same object relative to which the distance measurement is performed. An example of such other third optical instrument 97 is a laser pointer replacing the camera 93, and emitting a beam of light along the optical beam path 95. The beam of the laser pointer may coincide with the beam of measuring light 43 on an object, such that the beam of the laser pointer may generate a beam spot on this object which is visibly by the human eye. An operator of the surveying system 1 may then readily perceive the object and the position on the object which is the current target of the distance measurement. Another example for such other third optical instrument 97 is a tracker including a light source emitting a beam of light and a camera detecting light reflected from a target, wherein a controller of the surveying system controls the motors 29 and 73 and the motors 13 and 23 based on the detected light such that the beam of light is maintained on the target and follows the target when it is moving.

Moreover, each of the first optical instrument 17 and the second optical instrument 25 may be operated as a total station generating images of remote objects and performing distance measurements relative to remote objects, wherein the two total stations can be independently operated within a certain range of angles of allowed relative rotation between the first alidade 7 and the second alidade 19.

As illustrated in FIG. 1, the flat mirror 91 can be mounted on the chassis of the first optical instrument 17 outside of the window 44. Herein, the mirror 91 extends over a small portion of the circumference of the window 44 around the axis 27. Moreover, the mirror 91 can be integrated with the window 44. For example, the window can be formed in a polygonal shape composed of plural flat window portions distributed about the axis 27, and the mirror 91 can be provided by a reflective coating on one of these window portions.

If it is desired to perform distance measurements to distant objects without the measuring beam 41 of measuring light traversing the mirror 91, the first optical instrument 17 can be rotated about the axis 27 such that the mirror 91 is positioned close to the base 3 so that the mirror 91 would only affect distance measurements towards the base 3 or the alidades 7, 19 while other distant objects are not affected by the mirror 91.

The present application discloses in particular the following special embodiments:

Special Embodiment 1: A surveying system, comprising: a base; a first alidade mounted on the base and rotatable relative to the base about a first axis; a first optical instrument mounted on the first alidade, wherein the first optical instrument is configured to emit a first beam of measuring light; a second alidade mounted on the base and rotatable relative to the base about a second axis; and a second optical instrument mounted on the second alidade; wherein the second axis substantially coincides with the first axis.

Special Embodiment 2: The surveying system of Special Embodiment 1, wherein a smallest distance of the second axis from the first axis is less than 3 mm, less than 1 mm, or less than 0.1 mm, and/or wherein an angle between a direction of the first axis and a direction of the second axis is less than 1°, less than 0.3° or less than 0.1°.

Special Embodiment 3: The surveying system of Special Embodiment 1 or 2, wherein a greatest lateral extension of the base in a direction orthogonal to the first axis is less than 500 mm.

Special Embodiment 4: The surveying system of one of Special Embodiments 1 to 3, wherein the first optical instrument includes at least one component which is rotatable relative to the first alidade about a third axis.

Special Embodiment 5: The surveying system of Special Embodiment 4, wherein a smallest distance of the third axis from the first axis is less than 3 mm, less than 1 mm, or less than 0.1 mm, and/or wherein an absolute value of a difference between 90° and an angle between a direction of the first axis and a direction of the third axis is less than 1°, less than 0.3° or less than 0.1°.

Special Embodiment 6: The surveying system of Special Embodiment 4 or 5, wherein the at least one rotatable component of the first optical instrument includes a first mirror; and wherein the first beam of measuring light is reflected from the first mirror towards a distant object.

Special Embodiment 7: The surveying system of Special Embodiment 6, wherein the third axis intersects the first mirror.

Special Embodiment 8: The surveying system of Special Embodiment 6 or 7, wherein the first optical instrument includes a first light detector configured to receive emitted measuring light returning from the distant object and reflected from the first mirror.

Special Embodiment 9: The surveying system of Special Embodiment 8, wherein the surveying system is configured to determine a distance of the distant object from the surveying system.

Special Embodiment 10: The surveying system of one of Special Embodiments 1 to 9, wherein the second optical instrument includes optical components configured to provide at least one optical beam path; wherein the optical components include at least one second mirror; and wherein each of the at least one second mirror is arranged in one optical beam path of the at least one optical beam path.

Special Embodiment 11: The surveying system of Special Embodiment 10, wherein a portion of the optical beam path extends away from the second mirror towards a distant object; wherein the portion of the optical beam path has a central fifth axis; and wherein a smallest distance of the fifth axis from the third axis is less than 3 mm, less than 1 mm, or less than 0.1 mm.

Special Embodiment 12: The surveying system of Special Embodiment 11, wherein a smallest distance of the fifth axis from the first axis is less than 3 mm, less than 1 mm, or less than 0.1 mm.

Special Embodiment 13: The surveying system of one of Special Embodiments 10 to 12, wherein the at least one second mirror is a semi-transparent mirror; and wherein the first alidade can be rotated relative to the second alidade and the first mirror of the first optical instrument can be rotated relative to the first alidade such that the first beam of measuring light traverses the second mirror.

Special Embodiment 14: The surveying system of one of Special Embodiments 10 to 13, wherein the second optical instrument includes at least one first camera positioned in the at least one beam path and configured to record images of the distant object using light received via the at least one optical beam path.

Special Embodiment 15: The surveying system of Special Embodiment 14, wherein the following relation holds: $0.9 < L2/L1 < 1.1$, wherein L1 is a distance measured along a beam path of the camera between a mirror surface the mirror and an entrance pupil of a lens of the camera, and L2 is a distance between a point on the first axis which is closest to the third axis and the mirror.

Special Embodiment 16: The surveying system of Special Embodiment 10 to 15, wherein the optical components of the second optical instrument include plural second mirrors distributed about a fourth axis, and wherein each of the plural second mirrors is arranged in one optical beam path of the at least one optical beam path.

Special Embodiment 17: The surveying system of Special Embodiment 16, wherein a smallest distance of the fourth axis from the second axis is less than 3 mm, less than 1 mm, or less than 0.1 mm, and/or wherein an absolute value of a difference between 90° and an angle between a direction of the second axis and a direction of the fourth axis is less than 1°, less than 0.3° or less than 0.1°.

Special Embodiment 18: The surveying system of one of Special Embodiments 1 to 17, wherein the second alidade is rotatable relative to the first alidade over a range of more than 1°, in particular more than 5°, in particular more than 10° and in particular more than 20°.

Special Embodiment 19: The surveying system of one of Special Embodiments 1 to 18, wherein the second alidade is rotatable relative to the first alidade; and wherein the surveying system further comprises at least one motor for rotating the first alidade relative to the base and for rotating the second alidade relative to the base; and a controller configured to have a first mode of operation in which the at least one motor is driven to rotate the first alidade relative to the base at a given speed in a given direction, and to simultaneously maintain the second alidade relative to the base at a given position.

Special Embodiment 20: The surveying system of Special Embodiment 19, wherein the controller is configured to perform distance measurements relative to distant objects using the first optical instrument and to record images of the distant objects using the second optical instrument when it is in the first mode of operation.

Special Embodiment 21: The surveying system of Special Embodiment 19 or 20, wherein the controller is configured to have a second mode of operation in which the at least one motor is driven to rotate the first alidade relative to the base at the given speed in the given direction, and to rotate the second alidade relative to the base in the given direction at a speed greater than the given speed.

Special Embodiment 22: The surveying system of Special Embodiment 21, wherein the controller is configured to perform distance measurements relative to the distant objects using the first optical instrument when it is in the second mode of operation.

Special Embodiment 23: The surveying system of Special Embodiment 20 or 22, wherein the controller is configured to alternatingly operate in the first and second modes of operation.

Special Embodiment 24: A surveying system, comprising a base; at least one alidade mounted on the base and rotatable relative to the base about a first axis; a first mirror rotatable about a second axis of the at least one alidade: a first light source configured to emit a first beam of measuring light onto the first mirror such that the first beam of measuring light reflected from the first mirror can be directed to a distant object; at least one support rotatable about a third axis: at least one second mirror mounted on the at least one support at a distance from the third axis; and at least one optical instrument mounted on the at least one support: wherein the at least one optical instrument includes optical components configured to provide at least one optical beam path; wherein the at least one second mirror is positioned in the at least one optical beam path; and wherein the surveying system is configured such that the first mirror can be rotated to an angular position such that the first beam of measuring light reflected from the first mirror extends along a beam axis substantially coinciding with a main axis of a portion of the at least one optical beam path.

Special Embodiment 25: The surveying system of Special Embodiment 24, wherein the optical instrument includes a light detector.

Special Embodiment 26: The surveying system of Special Embodiment 25, wherein the light detector includes a camera.

Special Embodiment 27: The surveying system of one of Special Embodiments 24 to 26, wherein the third axis substantially coincides with the second axis.

Special Embodiment 28: The surveying system of Special Embodiment 27, wherein a smallest distance of the third axis from the second axis is less than 3 mm, less than 1 mm, or less than 0.1 mm, and/or wherein an angle between a direction of the third axis and a direction of the second axis is less than 1°, less than 0.3° or less than 0.1°.

Special Embodiment 29: The surveying system of Special Embodiment 27 or 28, wherein the at least one support includes a first support on which the at least one third mirror is mounted, and a second support on which the at least one optical instrument is mounted, and wherein at least the first support of the first and second supports is rotatable about the third axis.

Special Embodiment 30: The surveying system of Special Embodiment 29, wherein the first support is mounted on the first alidade.

Special Embodiment 31: The surveying system of Special Embodiment 29 or 30 in combination with one of Special Embodiments 1 to 23, wherein the second support is mounted the second alidade.

Special Embodiment 32: A method of operating a surveying instrument, comprising measuring distances of remote objects by operating a scanner; and recording images of the remote object by operating at least one camera: wherein the measuring of the distances comprises rotating the scanner about a first axis at a constant speed; wherein the recording of the images comprises repeating (i) rotating the at least one camera about a second axis at a speed greater than the constant speed for a first duration of time, and then (ii) maintaining the at least one camera at a stationary angular position about the second axis for a second duration of time: and wherein the second axis substantially coincides with the first axis.

Special Embodiment 33: The method of Special Embodiment 32, wherein of the operating of the scanner comprises rotating a beam of measuring light about a third axis substantially orthogonal to the first axis.

Special Embodiment 34: The method of Special Embodiment 32 or 33, wherein the scanner is rotated at the constant speed over a range of more than 360°.

Special Embodiment 35: The method of one of Special Embodiments 32 to 34, wherein the rotating of the at least one camera and the maintaining of the at least one camera at the stationary position is repeated more than 10 times, and in particular 20 times.

The invention claimed is:

1. A surveying system, comprising:
a base;
a first alidade mounted on the base and rotatable relative to the base about a first axis;
a first optical instrument mounted on the first alidade, wherein the first optical instrument is configured to emit a first beam of measuring light;
a second alidade mounted on the base and rotatable relative to the base about a second axis; and a second optical instrument mounted on the second alidade;

wherein the second axis substantially coincides with the first axis.

2. The surveying system of claim 1, wherein the first optical instrument includes at least one component which is rotatable relative to the first alidade about a third axis.

3. The surveying system of claim 1, wherein the first optical instrument includes at least one component which is rotatable relative to the first alidade about a third axis;

wherein the at least one rotatable component of the first optical instrument includes a first mirror; and wherein the first beam of measuring light is reflected from the first mirror towards a distant object.

4. The surveying system of claim 3, wherein the first optical instrument includes a first light detector configured to receive emitted measuring light returning from the distant object and reflected from the first mirror; and wherein the surveying system is configured to determine a distance of the distant object from the surveying system.

5. The surveying system of claim 3, wherein the second optical instrument includes optical components configured to provide at least one optical beam path;

wherein the optical components include at least one second mirror; and wherein each of the at least one second mirror is arranged in one optical beam path of the at least one optical beam path.

6. The surveying system of claim 5, wherein a portion of the at least one optical beam path extends away from the at least one second mirror towards a distant object;

wherein the portion of the optical beam path has a central fifth axis; and wherein a smallest distance of the central fifth axis from the third axis is less than 3 mm, less than 1 mm, or less than 0.1 mm.

7. The surveying system of claim 5, wherein the at least one second mirror is a semi-transparent mirror; and wherein the first alidade can be rotated relative to the second alidade and the first mirror of the first optical instrument can be rotated relative to the first alidade such that the first beam of measuring light traverses the at least one second mirror.

8. The surveying system of claim 5, wherein the second optical instrument includes at least one first camera positioned in the at least one optical beam path and configured to record images of the distant object using light received via the at least one optical beam path;

wherein, in particular, the following relation holds:

$$0.9 < L2/L1 < 1.1,$$

wherein:

L1 is a distance measured along a beam path of the at least one first camera between a mirror surface the mirror and an entrance pupil of a lens of the at least one first camera, and L2 is a distance between a point on the first axis which is closest to the third axis and the mirror.

9. The surveying system of claim 1, wherein the second alidade is rotatable relative to the first alidade; and wherein the surveying system further comprises:

at least one motor for rotating the first alidade relative to the base and for rotating the second alidade relative to the base; and a controller configured to have a first mode of operation in which the at least one motor is driven to rotate the first alidade relative to the base at a given speed in a given direction, and to simultaneously maintain the second alidade relative to the base at a given position.

10. A surveying system, comprising:

a base;

at least one alidade mounted on the base and rotatable relative to the base about a first axis;

a first mirror rotatable about a second axis of the at least one alidade;

a first light source configured to emit a first beam of measuring light onto the first mirror such that the first beam of measuring light reflected from the first mirror can be directed to a distant object;

at least one support rotatable about a third axis;

at least one second mirror mounted on the at least one support at a distance from the third axis; and at least one optical instrument mounted on the at least one support;

wherein the at least one optical instrument includes optical components configured to provide at least one optical beam path;

wherein the at least one second mirror is positioned in the at least one optical beam path; and wherein the surveying system is configured such that the first mirror can be rotated to an angular position such that the first beam of measuring light reflected from the first mirror extends along a beam axis substantially coinciding with a main axis of a portion of the at least one optical beam path.

11. The surveying system of claim 10, wherein the third axis substantially coincides with the second axis.

12. The surveying system of claim 10, wherein the at least one support includes a first support on which at least one third mirror is mounted, and a second support on which the at least one optical instrument is mounted, and wherein at least the first support of the first and second supports is rotatable about the third axis.

13. The surveying system of claim 12, wherein the at least one alidade includes a first alidade and a second alidade;

wherein the first support is mounted on the first alidade; and/or wherein the second support is mounted the second alidade.

14. A method of operating a surveying instrument, comprising:

measuring distances of remote objects by operating a scanner; and recording images of the remote objects by operating at least one camera;

wherein the measuring of the distances comprises rotating the scanner about a first axis at a constant speed;

wherein the recording of the images comprises repeating:

(i) rotating the at least one camera about a second axis at a speed greater than the constant speed for a first duration of time, and then (ii) maintaining the at least one camera at a stationary angular position about the second axis for a second duration of time; and wherein the second axis substantially coincides with the first axis.

15. The method of claim 14, wherein of the operating of the scanner comprises rotating a beam of measuring light about a third axis substantially orthogonal to the first axis; and/or wherein the scanner is rotated at the constant speed over a range of more than 360°; and/or wherein the rotating of the at least one camera and the maintaining of the at least one camera at the stationary position is repeated more than 10 times, and in particular 20 times.

\* \* \* \* \*